(12) United States Patent
Pihlaja

(10) Patent No.: US 7,541,566 B2
(45) Date of Patent: Jun. 2, 2009

(54) TRANSMITTER, RECEIVER, AND SYSTEM WITH RELATIVE POSITION DETECTING FUNCTIONALITY BETWEEN TRANSMITTERS AND RECEIVERS

(75) Inventor: Pekka Pihlaja, Helsinki (FI)

(73) Assignee: Nokia Corporation, Espoo (FI)

( * ) Notice: Subject to any disclaimer, the term of this patent is extended or adjusted under 35 U.S.C. 154(b) by 72 days.

(21) Appl. No.: 11/323,583

(22) Filed: Dec. 29, 2005

(65) Prior Publication Data

US 2007/0152131 A1    Jul. 5, 2007

(51) Int. Cl.
*G01J 1/32* (2006.01)
*G06M 7/00* (2006.01)
*G06F 3/033* (2006.01)

(52) U.S. Cl. .................. 250/205; 250/221; 345/157; 345/163

(58) Field of Classification Search .......... 250/205, 250/559.13, 559.15, 206.1, 206.2, 201.1, 250/221, 222.1; 356/320, 222, 226; 385/18; 345/157, 158, 163, 166, 173, 179
See application file for complete search history.

(56) References Cited

U.S. PATENT DOCUMENTS

| | | | | |
|---|---|---|---|---|
| 4,745,402 A * | 5/1988 | Auerbach | .................. | 345/158 |
| 5,023,943 A * | 6/1991 | Heberle | ...................... | 398/131 |
| 5,469,193 A | 11/1995 | Giobbi et al. | ................ | 345/158 |
| 5,734,371 A | 3/1998 | Kaplan | ........................ | 345/158 |
| 6,081,255 A | 6/2000 | Narabu | ........................ | 345/158 |
| 6,313,864 B1 * | 11/2001 | Tabata et al. | .............. | 348/14.02 |
| 6,333,733 B1 * | 12/2001 | Andersson et al. | .......... | 345/157 |
| 2004/0200955 A1 * | 10/2004 | Andzelevich | ............... | 250/221 |
| 2005/0018958 A1 * | 1/2005 | Huang et al. | ................... | 385/18 |
| 2005/0253806 A1 | 11/2005 | Liberty et al. | ................ | 345/156 |

FOREIGN PATENT DOCUMENTS

| | | |
|---|---|---|
| JP | 09037357 | 2/1997 |
| JP | 10-222293 | 8/1998 |

* cited by examiner

*Primary Examiner*—Georgia Y Epps
*Assistant Examiner*—Don Williams
(74) *Attorney, Agent, or Firm*—Harrington & Smith, PC

(57) ABSTRACT

A method is disclosed that includes transmitting from an emitter a pulse of an energy beam. The beam creates a field with a varying gradient, where the gradient has a direction substantially transverse to a propagation direction of the beam. One or more detectors receive a portion of the field. For a respective one of the one or more detectors, a value is determined corresponding to an illumination level of the portion of the field received by the detector, wherein the value of the field is indicative of relative position between the detector and the emitter. A transmitter includes an emitter adapted to transmit an energy beam, the beam creating a field with a varying gradient. The gradient has a direction substantially transverse to a propagation direction of the beam. The transmitter further includes control circuitry adapted to cause the emitter to transmit the energy beam for a first duration.

31 Claims, 12 Drawing Sheets

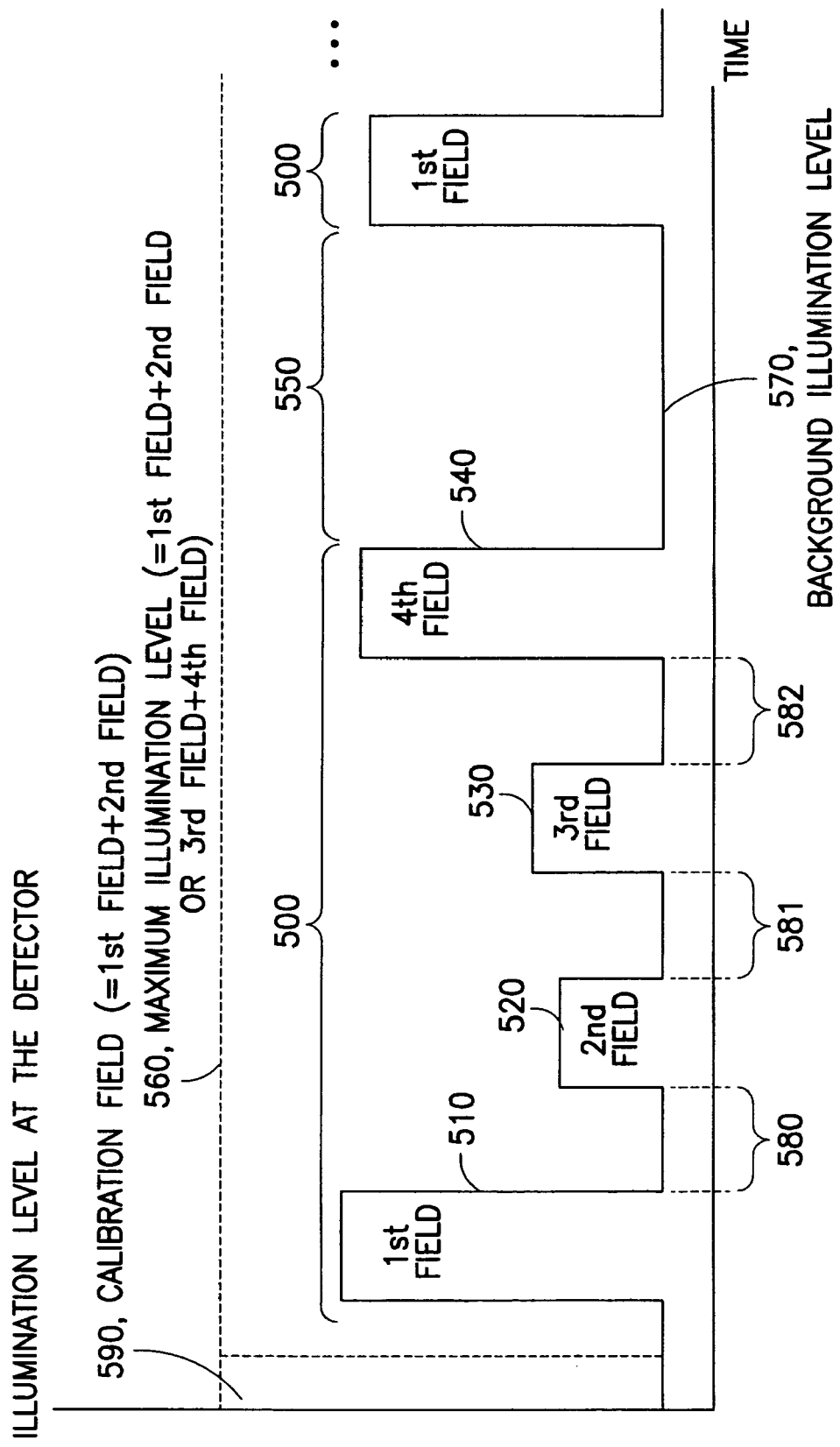

TRANSMITTER, RECEIVER, AND SYSTEM WITH RELATIVE POSITION DETECTING FUNCTIONALITY BETWEEN TRANSMITTERS AND RECEIVERS

TECHNICAL FIELD

This invention relates generally to transmitters, such as pointing devices, used to interact with other devices and, more specifically, relates to transmitters transmitting an illumination field and receivers receiving the illumination field.

BACKGROUND

Pointing devices, such as laser pointers, are transmitters that produce an energy beam in the visible wavelengths. Other pointing devices can use infrared (IR) wavelengths. These pointing devices create an energy beam, and are typically produced as a pulse. The energy beam is produced over a particular two- or three-dimensional angle that creates an illumination field over a certain region. The illumination field generally has constant illumination intensity in the region. Laser pointers tend to produce very narrow (e.g., over small angles), relatively high energy beams with longer pulses, while other pointing devices such as IR pointing devices produce wider (e.g., over larger angles), relatively low power energy beams with shorter pulses.

Pointing devices exist that are used to allow a user to interact with a device. For instance, pointing devices can be used for controlling a graphical user interface or a game on a large television (TV) screen. The pointing device, however, can interact with the receiver to perform pointing functions by orienting or changing orientation of the pointing device.

A problem with such pointing devices is that they need acceleration or gravity sensors for detecting the orientation or change of orientation of the device and a wireless connection for transmitting the orientation data to a receiver such as a TV set. These sensors and wireless transmitter add to the bulk, complexity, and cost of the pointing devices. Additionally, the receiver also has to be implemented with a wireless connection for communication with the pointing device.

Nonetheless, accelerometer equipped handheld pointing devices have been introduced where scrolling and pointing on a display of a controlled device is achieved by tilting and moving the pointing device. For example, two types of devices incorporating accelerometers are as follows. One device is a handheld remote controller used for pointing on a stationary device, such as a TV set. The other device is a handheld stand-alone device (like the motion-controlled mobile phone) which can be controlled by tilting the device.

A problem here is that the handheld pointing device cannot be used while walking or used while riding in a moving vehicle. One could mount another accelerometer on the user and have the accelerometer calculate the movement of the pointing device relative to the user, which would alleviate the mentioned problem. This is technically rather complicated to implement, however, and is costly.

Thus, there are problems with current pointing devices and associated receivers.

BRIEF SUMMARY

In an exemplary embodiment of the invention, a method is disclosed that includes transmitting from an emitter a pulse of an energy beam. The beam creates a field with a varying gradient, where the gradient has a direction substantially transverse to a propagation direction of the beam. One or more detectors receive a portion of the field. For a respective one of the one or more detectors, a value is determined corresponding to an illumination level of the portion of the field received by the detector, wherein the value of the field is indicative of relative position between the detector and the emitter.

In another exemplary embodiment, a transmitter includes an emitter adapted to transmit an energy beam, the beam creating a field with a varying gradient. The gradient has a direction substantially transverse to a propagation direction of the beam. The transmitter further includes control circuitry adapted to cause the emitter to transmit the energy beam for a duration.

In another exemplary embodiment, a receiver includes one or more detectors adapted to receive a portion of a first field of a first energy beam, the first field having a first varying gradient having a first direction substantially transverse to a propagation direction of the first beam. The one or more detectors are further adapted to receive a portion of a second field of a second energy beam, the second field having a second varying gradient having a second direction substantially transverse to a propagation direction of the second beam. The receiver further includes detector circuitry coupled to the one or more detectors and adapted to determine values, each value corresponding to a portion of the field received by a respective one of the one or more detectors. The detector circuitry is further adapted to use the values to determine relative position between the respective detector and one or more emitters that emitted the first and second beams.

BRIEF DESCRIPTION OF THE DRAWINGS

The foregoing and other aspects of embodiments of this invention are made more evident in the following Detailed Description of Exemplary Embodiments, when read in conjunction with the attached Drawing Figures, wherein:

FIG. 5 is a graph of values of illumination produced by a detector at the receiver for the pulses of energy beams in FIGS. 1-4;

DETAILED DESCRIPTION OF EXEMPLARY EMBODIMENTS

The inventor has realized that it would be beneficial to provide relative position detecting functionality between a transmitter such as a pointing device and a receiver, so that orientation or change in orientation between transmitter and receiver can be determined with minimal or no sensors and while allowing such systems to be used while walking or used while riding in a moving vehicle. Consequently, certain exemplary embodiments of the disclosed invention provide transmitters, receivers, and systems with relative position detecting functionality for positioning between detectors on receivers and emitters on transmitters. Exemplary embodiments allow the systems to be used while walking or in an automobile.

Figure 6:
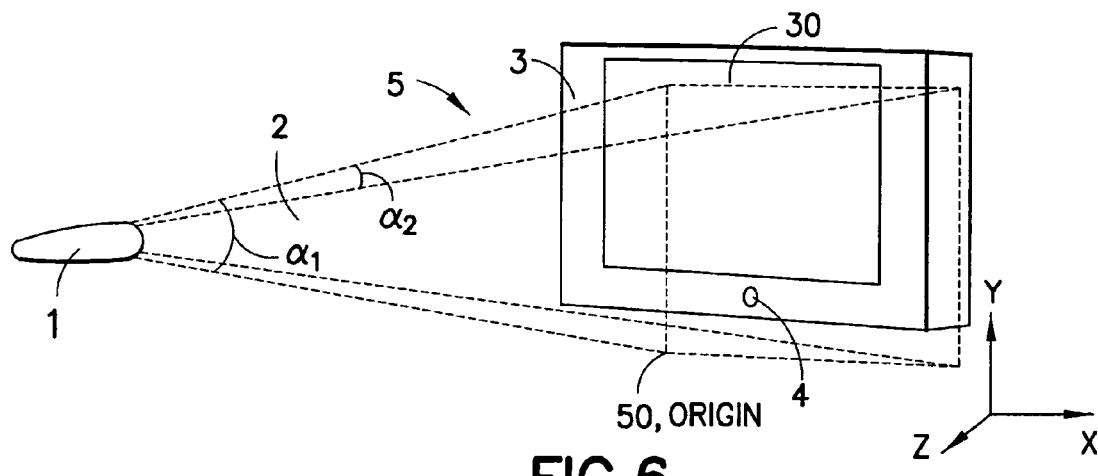
FIGS. 6-8 are representations of pulses of energy beams communicated between a pointing device and a receiver.
Figure 7:
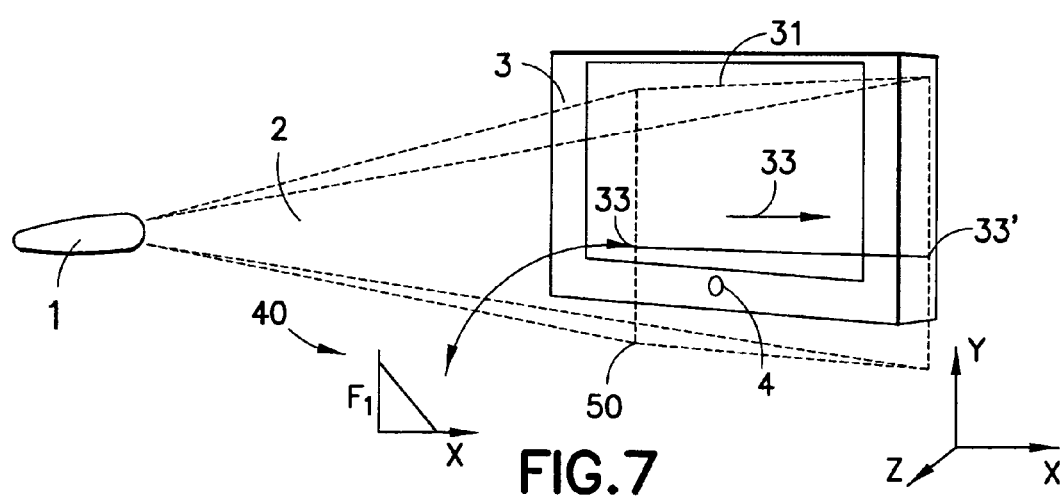
Figure 8:
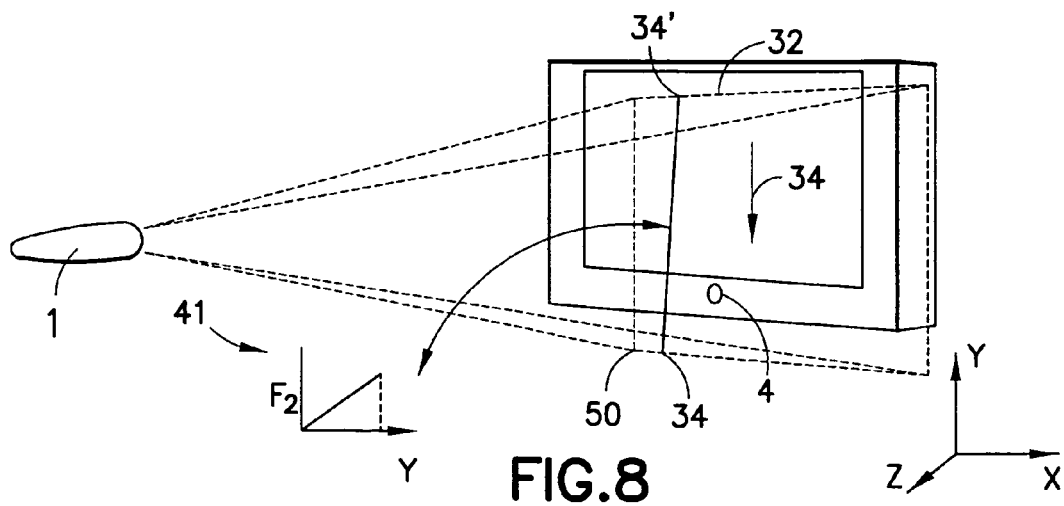

Referring now to FIGS. 6-8, a pointing device 1, as an example of a transmitter, emits a beam 2 of infrared (IR) light. The beam 2 is transmitted toward and is intercepted by a television (TV) 5, an example of a receiver, which has a detector 4 on a bezel 3 of the TV 5. In the examples of FIGS. 6-8 the pointing device I is being held stationary. In the example of FIG. 6, the width (or angle, $\alpha_1$, to be more precise) of the beam along the y-axis would typically be about 120 degrees. The width (or angle, $\alpha_2$) is about 120 degrees along the x-axis.

At a first stage, a first illumination field 30 (see FIG. 6) lasting, e.g., a 20 milliseconds (ms) pulse would be emitted. The first illumination field 30 has a uniform intensity. This illumination field 30 is a calibration field and allows the detector 4 to determine the maximum illumination level of the illumination field 30 at the detector 4. A detector 4, in this example a photodiode, on the controlled device (e.g., TV 5) measures the level of the illumination falling upon the photodiode during the transmission of the illumination field 30. The photodiode detector 4 is located on the bezel 3. In FIGS. 6-8, the origin 50 is shown being at the lower left corner of a respective illumination field 30-32 and an exemplary coordinate system is also shown.

In a second stage, the pointing device 1 emits a second beam 2 having an illumination gradient 31. Graph 40 shows that the magnitude, $F_1$, of the illumination field 31 goes from high (e.g., at point 33) to low (e.g., at point 33') along the x-axis in FIG. 7. In the example of FIG. 7, the intensity gradient 33 has a direction in the +x direction. The optics of the pointing device 1 can designed to give a linear gradient either on a flat or a hemispheric projection surface. Flat is shown in the figures herein. In the example of FIG. 7, point 33 coincides with the maximum illumination level of the illumination field 31 at the detector 4 and point 33' coincides with the minimum illumination level of the illumination field 31 at the detector 4. It is notable that the intensity gradients 33, 34 shown in FIGS. 7 and 8 are intensity gradients that are positioned from high intensity to low intensity (e.g., the intensity gradients have a negative value). The opposite could also be the case: the intensity gradients could be positioned from low intensity to high intensity (e.g., the intensity gradients could have positive values). In the example of FIG. 7, for instance, the arrow could be drawn 180 degrees from its current position. The intensity gradient in FIGS. 7 and 8 should be as linear as possible in this example.

A detector 4 measures the level of the illumination falling upon the photodiode during the transmission of the illumination field 31. If, for example, the pointing device 1 is pointed to the right as shown, the photodiode detector 4 coincides somewhere nearer the left margin of the illumination field and consequently the level of illumination would be high. If the pointing device 1 is pointed toward the left, the illumination level at the photodiode detector 4 would be low.

The same procedure applies for the third illumination field 32 (FIG. 8), producing intensity gradient 34. Graph 41 shows that the magnitude, $F_2$, of the illumination field 32 goes from low (e.g., at point 34) to high (e.g., at point 34') along the y-axis in FIG. 8. In this example, point 34' coincides with the maximum illumination level of the illumination field 32 at the detector 4 and point 34 coincides with the minimum illumination level of the illumination field 32 at the detector 4. The intensity gradients 33 and 34 in FIGS. 7 and 8, respectively, are substantially perpendicular. Small errors, between for instance 5 or 10 percent, in perpendicularity should not matter too much in accuracy of the output by the TV 5 and detector 4.

Between the periods when the illumination fields 30-32 are sent, there is typically a period during which the pointing device 1 will not be transmitting. The detector 4 during this time can determine the background illumination level, which is the minimum illumination level of the illumination field at the detector 4.

Because the television 5 has determined the maximum and minimum illumination levels and values of illumination corresponding to an illumination level for an illumination field 31, 32, the television 5 can determine values for a relative position of the detector 4 relative to the pointing device 1, as explained in more detail below.

Figure 9:
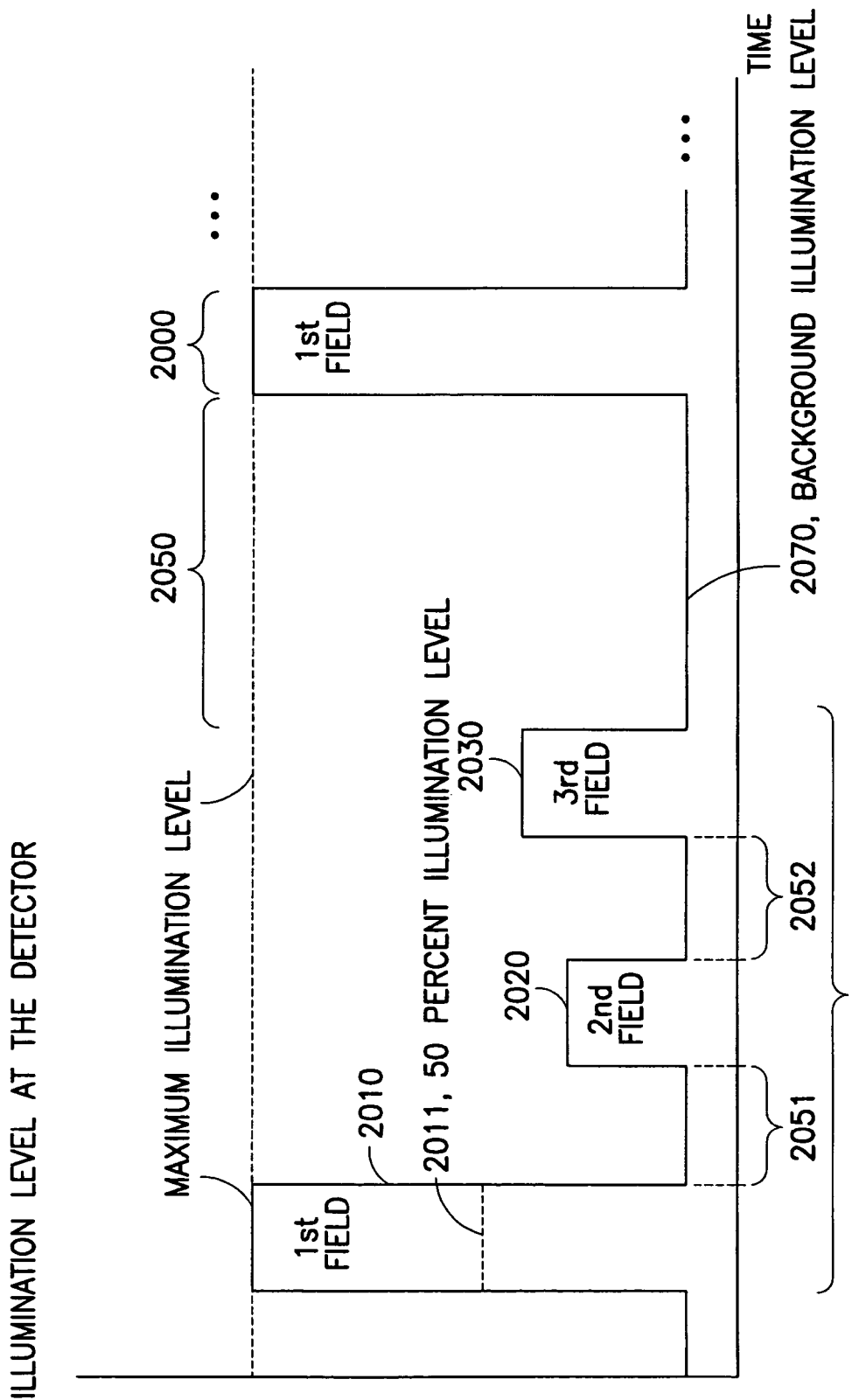
FIG. 9 is a graph of values of illumination produced by a detector at the receiver for the pulses of energy beams in FIGS. 6-8.

Turning now to FIG. 9 with appropriate reference to FIGS. 6-9, a graph is shown of values of illumination produced by a detector at the receiver for the pulses of energy beams in FIGS. 6-8. The illumination level at the photodiode detector 4 during reception of an illumination field 30-32 is dependent on not only the position of the detector 4 in a respective illumination field 30-32 (e.g., and a corresponding intensity gradient 33, 34), but also the distance of the pointing device I and level of background IR radiation. One technique for generating illumination fields 30-32 is to use three light emitting diodes (LEDs), one for each illumination field. Illumination fields from three LEDs are represented in FIG. 9. Sequence 2000 is made of three pulses, each generating an illumination field. The pulse 2010 generates the calibration illumination field 30; pulse 2020 generates illumination field 31; and pulse 2030 generates illumination field 32. The height of the illumination level corresponds to a value of illumination at a detector 4.

There are pauses 2051, 2052 between the pulses 2010, 2020, and 2030 of a sequence 2000 and typically a longer pulse 2050 between sequences 2000. The pauses can be used to determine the background illumination level 2070, which should be the same as the lowest illumination levels at points 33' and 34 at the detector 4 for an illumination field 31, 32, respectively. The pulse 2010 should produce the maximum illumination level at the detector 4, and the maximum illumination level should be the same as the highest illumination levels at points 33 and 34' at the detector 4 for an illumination field 31, 32, respectively.

A position of the detector in the illumination fields 31, 32 can be expressed as an (x,y) position vector with the origin of coordinates, e.g., in the bottom left corner of the field, as shown in FIGS. 6-8. In the configuration of FIG. 9 (e.g., and corresponding FIGS. 6 and 7), the x-coordinate would be: X=2nd field/(1st field−zero level) * k, where the zero level is the illumination value determined during a pause 2051, 2050, and k is a constant. For instance, setting k=100 would yield percent. Similar calculations could by used for the y-coordinate. The calibration fields for maximum and minimum illumination levels could be substituted with an illumination level 2011 of a calibration field that demonstrates the 50 percent (e.g., medium) illumination level. The illumination level 2011 places the origin of coordinates in the center of the field.

It should also be noted that the illumination levels 2010, 2020, and 2030 can be used to detect movement. In the latter example, there would not necessarily be an actual determination of an (x,y) vector and instead, movement would be determined through comparison of current values for illumination levels 2020, 2030 with previously determined value for these illumination levels. This is described in more detail below.

Figure 10:
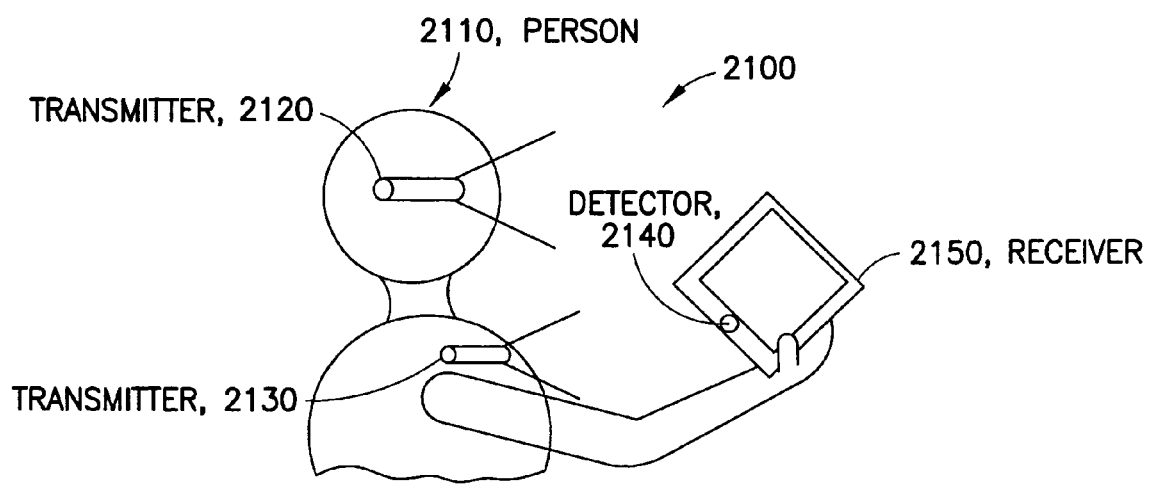
FIG. 10 is a diagram of an example of a system a person can use to control functions of a receiver.

The examples of FIGS. 6-8 can be implemented and used in a number of ways. Illustratively, FIG. 10 shows an example of a system 2100 that a person 2110 can use to control functions of a receiver. A transmitter 2130 is clipped onto the front of the clothing of the user. The receiver 2150 is held in the hand(s) and a function of the receiver is controlled by moving the receiver 2150 translationally in the x- and y-directions. For example, the person 2110 could scroll up/down or right/left or could move a mouse pointer simply by moving the receiver 2150.

As another example, the transmitter 2130 is clipped on the clothing of the user and a second transmitter 2120 is clipped on headwear (not shown). Scrolling and zooming on a handheld display (e.g., receiver 2150) could be achieved by moving the hands and a cursor could be controlled by turning the head (e.g., up, down, sideways). In this exemplary embodiment, the detector 2140 would comprise two detectors, one detector corresponding to each of the transmitters 2120, 2130. Each transmitter 2120, 2130 would operate at different wavelengths, and several detectors would operate at corresponding wavelengths. It should be noted that wavelength and frequency are related and will be considered to be equivalent herein (e.g., a range of wavelengths corresponds to a range of frequencies).

A single illumination field such as an illumination field 31, 32 has a Signal-to-Noise Ratio (SNR) that typically gets worse towards the "dark end"(e.g., points 33', 34, respectively) of the illumination field. However, this reduction in SNR probably does not matter, and the embodiments described above are easy to understand. Nevertheless, should the lower SNR of the dark end of an illumination field, options exist for improving the overall SNR of relative position measurements.

Referring now to FIGS. 1-4, techniques are shown for increasing the SNR of received illumination fields. As with FIGS. 7 and 8, pointing device 1 emits a beam 2 of infrared (IR) light. The beam 2 is transmitted toward and intercepts a television (TV) 5, which has a detector 4 on a bezel 3 of the TV 5. In the examples of FIGS. 1-4 the pointing device 1 is again being held stationary.

Figure 1:
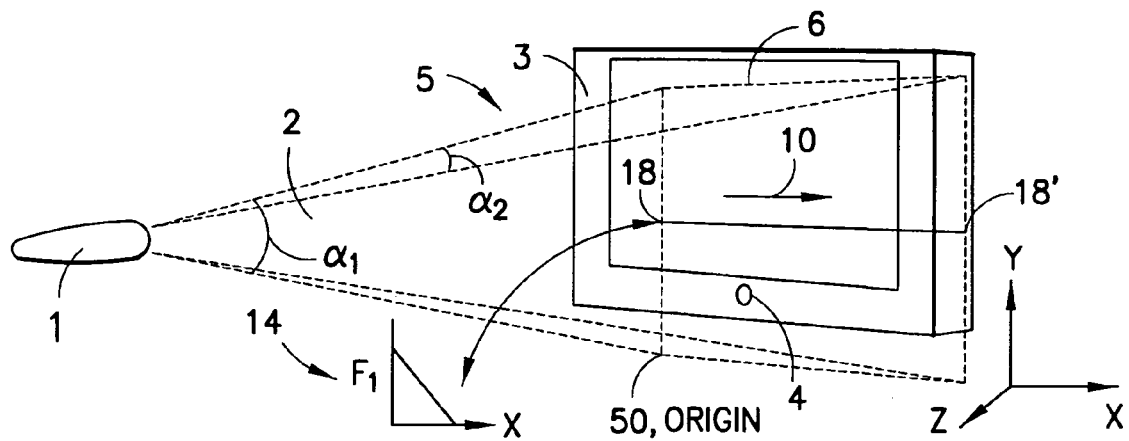
FIGS. 1-4 are representations of pulses of energy beams communicated between a pointing device and a receiver.
Figure 2:
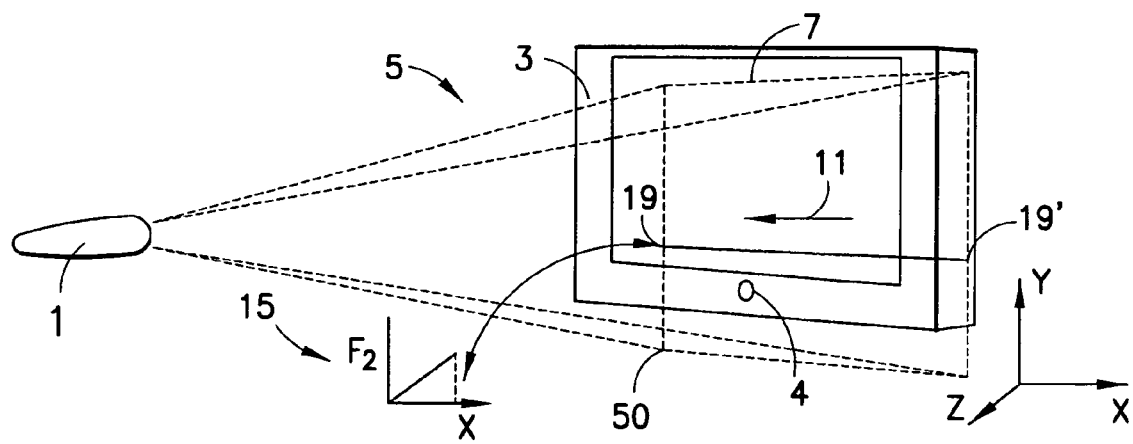
Figure 3:
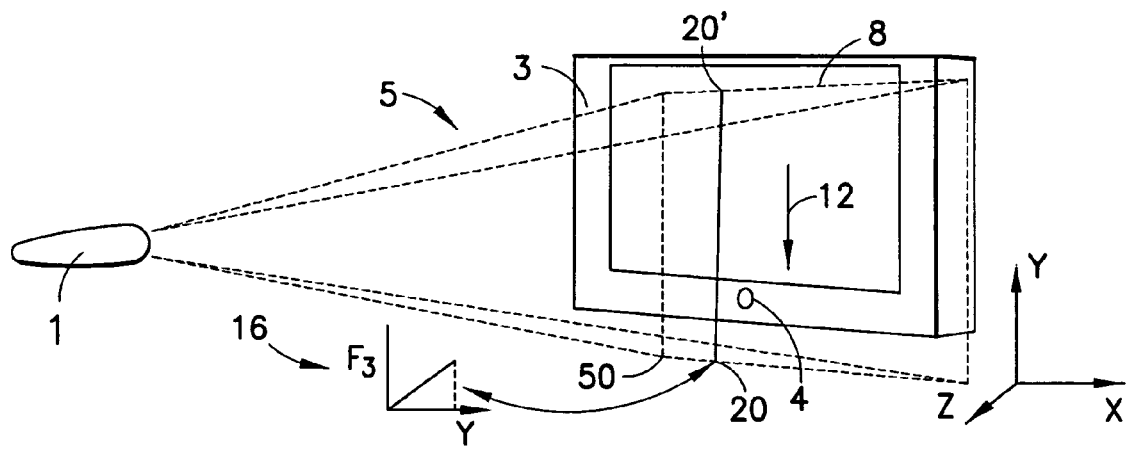
Figure 4:
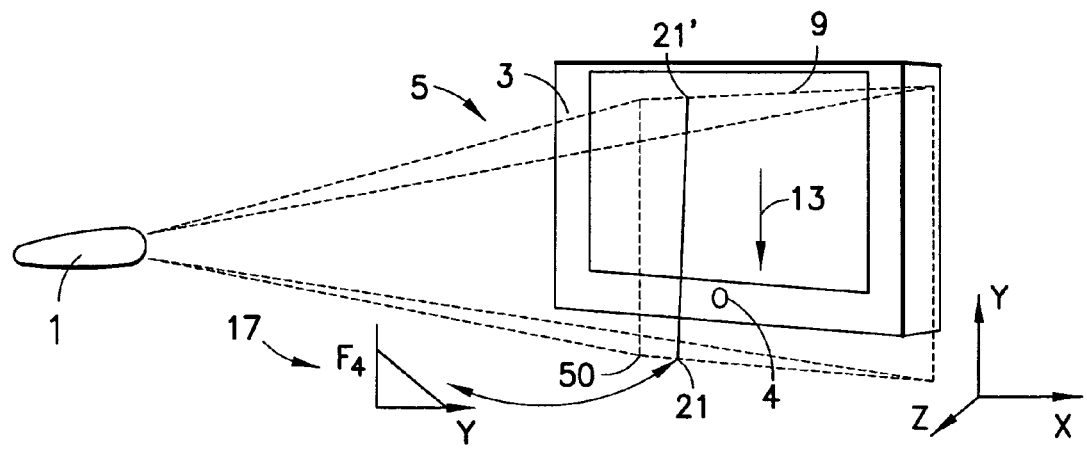

At a first stage, a first illumination field 6 (see FIG. 1) lasting, e.g., a 20 milliseconds (ms) pulse would be emitted. The first illumination field 6 creates an intensity gradient 10, with the illumination highest, e.g., at the left margin of the illumination field 6, as illustrated by graph 14. In FIGS. 1-4, the origin 50 is shown being at the lower left corner of a respective illumination field 6-9 and an exemplary coordinate system is also shown. Graph 14 shows that the magnitude, $F_1$, of the illumination field 6 goes from high (e.g., at point 18) to low (e.g., at point 18') along the x-axis in FIG. 1. In the example of FIG. 1, the intensity gradient 18 has a direction in the +x direction. It is notable that the intensity gradients shown in FIGS. 1 to 4 are intensity gradients that are positioned from high intensity to low intensity (e.g., the intensity gradients have a negative value). The opposite could also be the case: the intensity gradients could be positioned from low intensity to high intensity (e.g., the intensity gradients could have positive values). In the example of FIG. 1, for instance, the arrow could be drawn 180 degrees from its current position. The intensity gradient in FIGS. 1-4 should be as linear as possible in this example. The detector 4, a photodetector, measures the illumination at the detector 4.

Next, a second illumination field 7 (see FIG. 2) is emitted by the pointing device 1, producing another intensity gradient 11 for, e.g., another 20 ms pulse. This time the illumination is highest at the right margin of the illumination field 7, as illustrated by graph 15. The intensity gradient 11 has a direction in the −x direction (i.e., the direction is opposite the direction of intensity gradient 10). Again, the illumination is measured by the photodiode detector 4 on the TV 5. Graph 15 shows that the magnitude, $F_2$, of the illumination goes from high (e.g., at point 19) to low (e.g., at point 19') along the x-axis in FIG. 2.

Note that the change in direction of the intensity gradient between illumination fields 6 and 7 occurs when each of the beams 2 are transmitted and not necessarily at reception. In other words, at the detector 4, if the pointing device is being rotated extremely rapidly, the two illumination fields 6, 7 may not have exactly opposite directions of intensity gradients 10, 11, respectively. Nonetheless, the two illumination fields 6, 7 were transmitted with approximately opposite directions of intensity gradients 10, 11, respectively.

The same procedure applies for the third illumination field 8 (FIG. 3), producing intensity gradient 12, and for the fourth illumination field 9 (FIG. 4), producing intensity gradient 13. Graph 16 shows that the magnitude, $F_3$, of the illumination field 8 goes from low (e.g., at point 20) to high (e.g., at point 20') along the y-axis in FIG. 3. Graph 8 shows that the magnitude, $F_4$, of the illumination field 9 goes from low (e.g., at point 21) to high (e.g., at point 21') along the y-axis in FIG. 4. The intensity gradients 12 and 13 are in the directions −y and +y, respectively. After the fourth field 9 has been transmitted, the sequence starts over with the first field 6.

Note that the directions of the intensity gradients change between pulses in this exemplary embodiment. In particular, the intensity gradient is reversed between the pulses shown in FIGS. 1 and 2 (intensity gradients 10 and 11) and the pulses shown in FIGS. 3 and 4 (intensity gradients 12 and 13). The direction of the intensity gradient also is changed by 90 degrees (e.g., from 180 to 270 degrees) between the pulses shown in FIGS. 2 and 3 (intensity gradients 11 and 12). It should be noted that this sequence is merely exemplary. For instance, the illumination fields could be transmitted in the sequence 6, 9, 8, 7 instead of 6, 7, 8, and 9. It should also be noted that the directional change in intensity gradients between pulses for a particular axis need not be exactly opposite. For example, the direction change could be 170 or 175 degrees instead of 180 degrees.

Additionally, the illumination fields 6-9 and their respective intensity gradients 10-13 (and the illumination fields 31 and 32 and their respective intensity gradients 33 and 34) are substantially transverse to a direction, the z direction in FIGS. 1-4, of propagation of the beam 2. The illumination fields 6-9 and their respective intensity gradients 10-13 can be substantially transverse because the surface of the illumination fields 6-9 would actually be curved somewhat, having a hemispheric surface. It is noted that the optics of the pointing device 1 can designed to give a linear gradient either on a flat or a hemispheric projection surface.

The illumination level at the photodiode detector 4 during reception of an illumination field 6-9 is dependent on not only the position of the detector 4 in a respective intensity gradient 10-13, but also the distance of the pointing device 1 and level of background IR radiation. One technique for generating illumination fields 6-9 is to use four light emitting diodes (LEDs), one for each illumination field. Illumination fields from four LEDs are shown in FIG. 5. Sequence 500 is made of four pulses, each generating an illumination field. The pulse 510 generates illumination field 6; pulse 520 generates illumination field 7; pulse 530 generates illumination field 8; and pulse 540 generates illumination field 9. The height of a pulse corresponds to the value of illumination at a detector 4.

The receiver should be synchronized with the pointing device, i.e., the receiver should be able to determine which illumination field is the first illumination field of a sequence and in what order the sequence of illumination fields there will be. This can be accomplished for instance by transmitting the sequence as a burst with pauses in between. There is a pause 550 prior to another sequence 500 of pulses 510, 520, 530, and 540 and pauses 580, 581, 582 between the pulses 510-540.

A calibration field 590 could be created by firing two LEDs simultaneously, so that, e.g., intensity fields 6 and 7 are superimposed. A calibration field 590 at the beginning of each sequence of pulses 510-540 would tell the receiver what is the maximum possible illumination level at the current distance of the pointing device 1. Note that as the illumination fields 6-9 are linear and symmetrical in this example, the resulting calibration field 590 has uniform illumination.

The maximum illumination level 560 at any distance can also be deduced without using a calibration field 590: At any point and any distance, the maximum possible illumination level 560 is equivalent to the sum of illumination levels during 1st and 2nd illumination fields or 3rd and 4th illumination fields, as shown in FIG. 5.

The background illumination level 570 can be measured between the fields. To maximize signal-to-noise ratio, it is beneficial to have the transmitter and receiver work at a very narrow bandwidth. It should be noted that it is beneficial, when using the same frequency of transmission for the pulses 510-540, for the pulses 510-540 to be non-overlapping, such that there are pauses 581-582 between pulses 510-540. However, it could be possible when using a single frequency when producing the pulses 510-540 for the pulses 510-540 to overlap, if desired, as long as there is some time period during which one pulse is on while the other pulses are off.

It should be clear to one skilled in the art as to how to calculate the x- and y-coordinates from the measured intensities during the fields and the background and maximum illumination levels. For example, in the configuration of FIG. 5, the x-coordinate would be: X=(2nd field−zero level)/(1st field+2nd field−zero level)*k, where the zero level is the ambient radiation determined during a pause (e.g., pause 580) and k is a constant. Similar calculations could by used for the y-coordinate.

What is also of interest is how the relative levels of illumination during the illumination fields change between sequences. These changes tell which direction the remote pointing device 1 is moving translationally or rotationally. Consequently, the pointing device is beneficially used either in relative position control mode for translational movement (e.g., like a tabletop mouse) or for rotational movement (e.g., velocity determination like a joystick).

Note that even in absolute position control mode, pointing the pointing device 1 is not like pointing with a laser pointer, which is absolute in its strictest sense. Absolute position control mode attempts to determine the x,y values at which the pointing device 1 resides relative to the detector 4. With a pointing device 1, the 'gain'(e.g., pointing device movement or pointing device rotation) can be varied freely. In relative position control mode, the gain can be dynamically variable as with a normal tabletop mouse. Relative position control mode attempts to determine movement or rotation of the pointing device 1 relative to the detector 4.

One way of moving the illumination field across the detector 4 is by rotating the pointing device 1. But, movement can be done also by moving the pointing device 1 translationally, i.e., sideways or up and down. This can be turned into an advantage: Coarse pointing can be performed by rotational movement and fine pointing performed by translational movements. A user would soon be able to perform these movements and realize the results. Note however, that the gain of translational movement is dependent on the distance between pointing device 1 and detector 4 (whereas the gain of rotational movement is independent of the distance). It should be noted that another technique for fine pointing is also described in reference to FIG. 19.

Figure 17A:
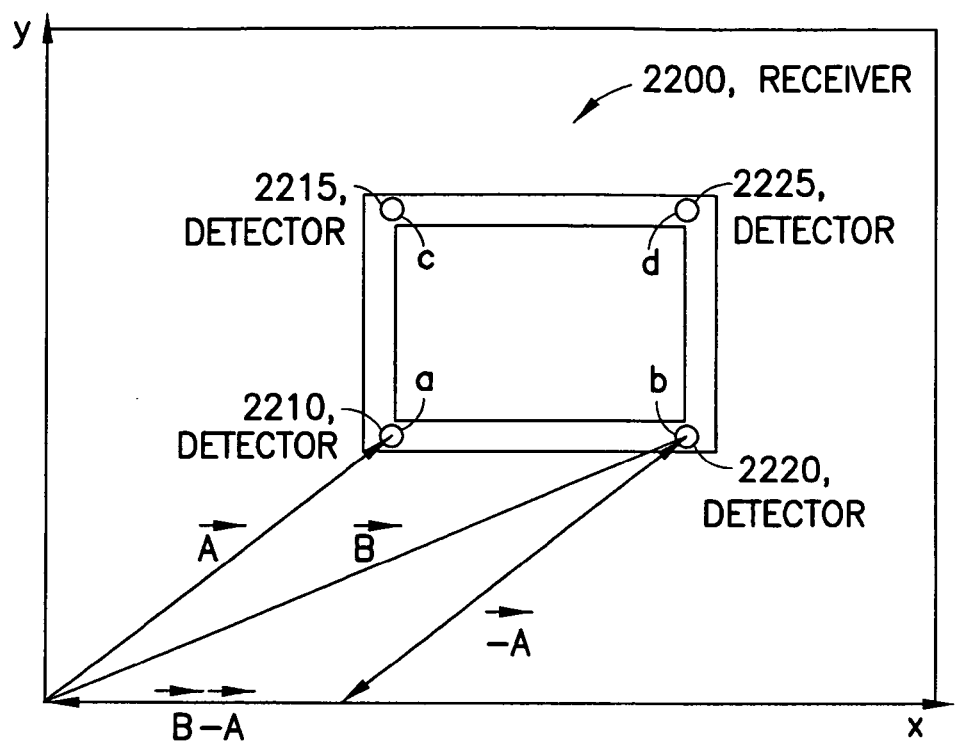
FIGS. 17A and 17B are diagrams showing examples of using multiple detectors to detect rotation about the z axis.
Figure 17B:
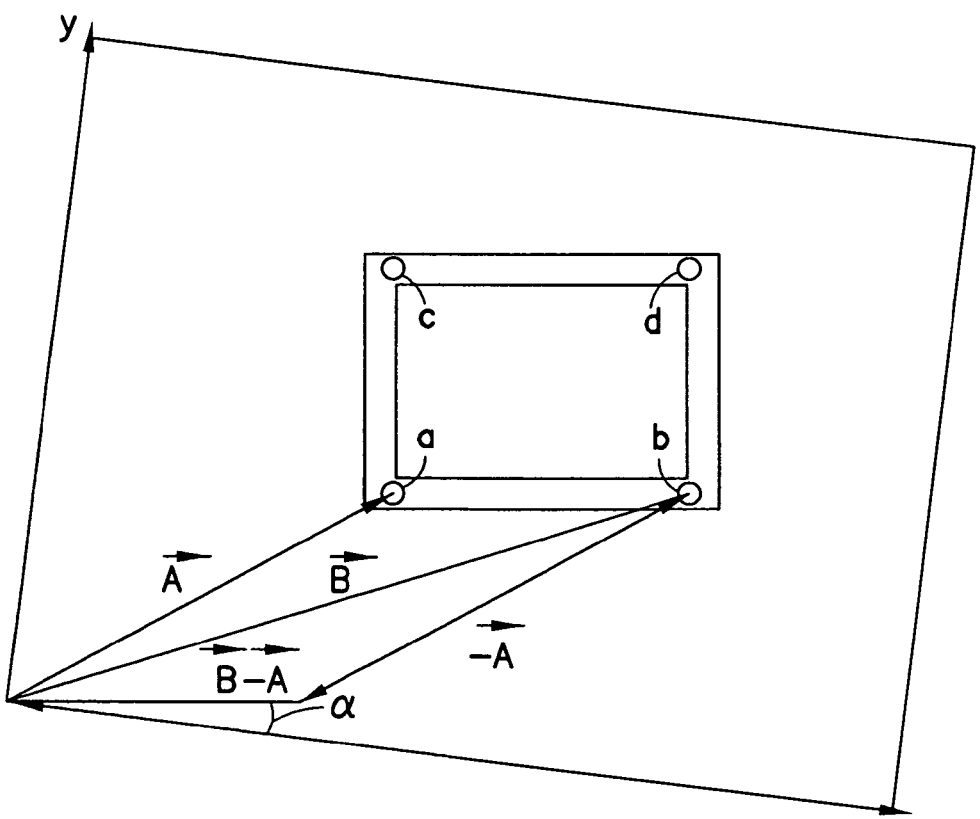

Unintentional rotation of the emitter or the receiver about the z-axis (of either the emitter or receiver) can affect pointing in the x- and y-directions. A technique for determining rotation of the emitter or the receiver about the z-axis (of either the emitter or receiver) is shown in FIGS. 17A and 17B. In FIG. 17A, two detectors 2210 and 2220 on receiver 2200 are used to determine illumination from an emitter (not shown in FIGS. 17A or 17B) that produces an illumination field (also not shown in FIGS. 17A or 17B) having a series of intensity gradients in the x and y directions, as previously described. The two detectors 2210 and 2220, referred to as "detector a" and "detector b" respectively, are displaced, e.g., horizontally on the receiver 2220. Each detector 2210, 2220 will determine different position vectors $\vec{A}$ and $\vec{B}$, respectively, as shown in FIG. 17A.

The vector A represents the (x,y) position of the position of the detector a in the illumination fields, as determined by the whole series of intensity gradients (e.g., possibly including illumination fields having a uniform intensity at maximum illumination level) as described in reference to FIGS. 1-4 and 6-8 above. Similarly, the vector $\vec{B}$ represents the (x,y) position of detector b in the illumination fields, as determined by the whole series of intensity gradients (e.g., possibly including illumination fields having a uniform intensity at maximum illumination level) as described in reference to FIGS. 1-4 and 6-8 above. Hence, the vectors $\vec{A}$ and $\vec{B}$ represent position vectors.

More specifically, the vector $\vec{A}$ may be represented as $\vec{A}=A_x\hat{x}+A_y\hat{y}$, where $A_x$ and $A_y$ are scalars indicating (x,y) positions of the detector a relative to an origin, (0,0), of the illumination field. Similarly, the vector $\vec{B}$ may be represented as $\vec{B}=B_x\hat{x}+B_y\hat{Y}$ where $B_x$ and $B_y$ are scalars indicating (x,y) positions of the detector b relative to an origin, (0,0), of the illumination field. Then, $\vec{B}-\vec{A}=(B_x-A_x)\hat{x}+(B_y-A_y)\hat{y}$, and $\tan(\alpha)=(B_y-A_y)/(B_x-A_x)$, where α is the angle between the x axis and the vector $\vec{B}-\vec{A}$.

This information can be used for calculating correction for the (x,y)-position and/or as an extra input. For example, the receiver 2200 could be a stationary device, such as a TV set, and the emitter could be a hand-held remote controller, mainly operated with a tilting action.

Figure 18:
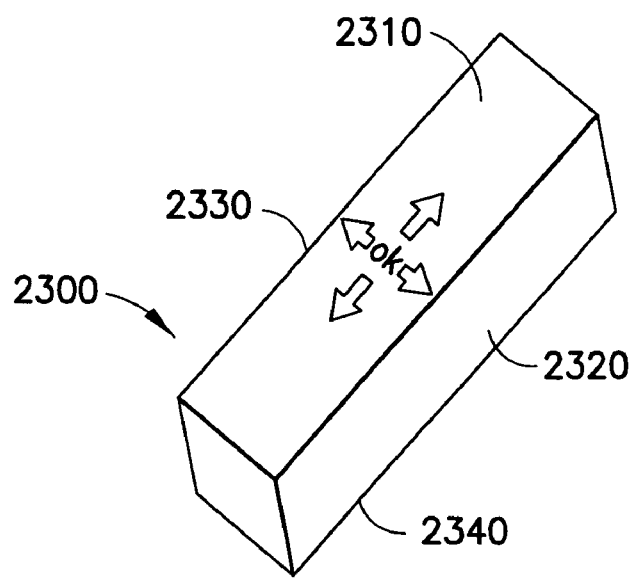
FIG. 18 is an exemplary remote control incorporating an emitter of the disclosed invention.

For instance, turning to FIG. 18, a remote controller 2300 could have a rectangular cross-section, with a different keypad on each face (e.g., two or more faces 2310, 2320, 2330, and 2340). The mode of the receiver 2200 could be changed automatically, as any of the faces 2310-2340 is rotated to the top for use.

Returning to FIGS. 17A and 17B, the length of vector B−A, denoted |B−A|, decreases linearly as the physical distance between the emitter and the receiver 2200 increases. As the physical distance between the detectors 2210, 2220 is known, the physical distance of the emitter from the receiver 2200 can be calculated from |B−A|. This is, provided that the receiver 2200 is held substantially perpendicular to the beam.

Rotation about y-axis would also shorten the vector |B−A|. Using two detectors 2210, 2220, it is generally not possible to know if a shorter |B−A| is because of distance between the receiver 2220 and detector 2280 or rotation (e.g., of the receiver 2220) about the y-axis. If rotation about x- and y-axes is likely and distance information is required, more detectors should be used.

For example, detectors a, b, c and d (detectors 2210, 2220, 2215, 2225, respectively) can be arranged in a square array on the front face of the receiver 2200. The (x,y)-values for position vectors A, B, C (not shown) and D (not shown) in will form a perspective image of the array. Each possible combination of position and degree of rotation of the receiver 2200 produces a unique set of position vectors A, B, C and D. Consequently, one can develop algorithms which unambiguously give the (x,y,z)-position and (x,y,z)-rotation of the receiver 2200. This is, as long as the receiver 2200 is not rotated more than 90 degrees about the x-and y-axes. There is no need to rotate more, as one would not be able to see a display on the receiver 2200.

Figure 11:
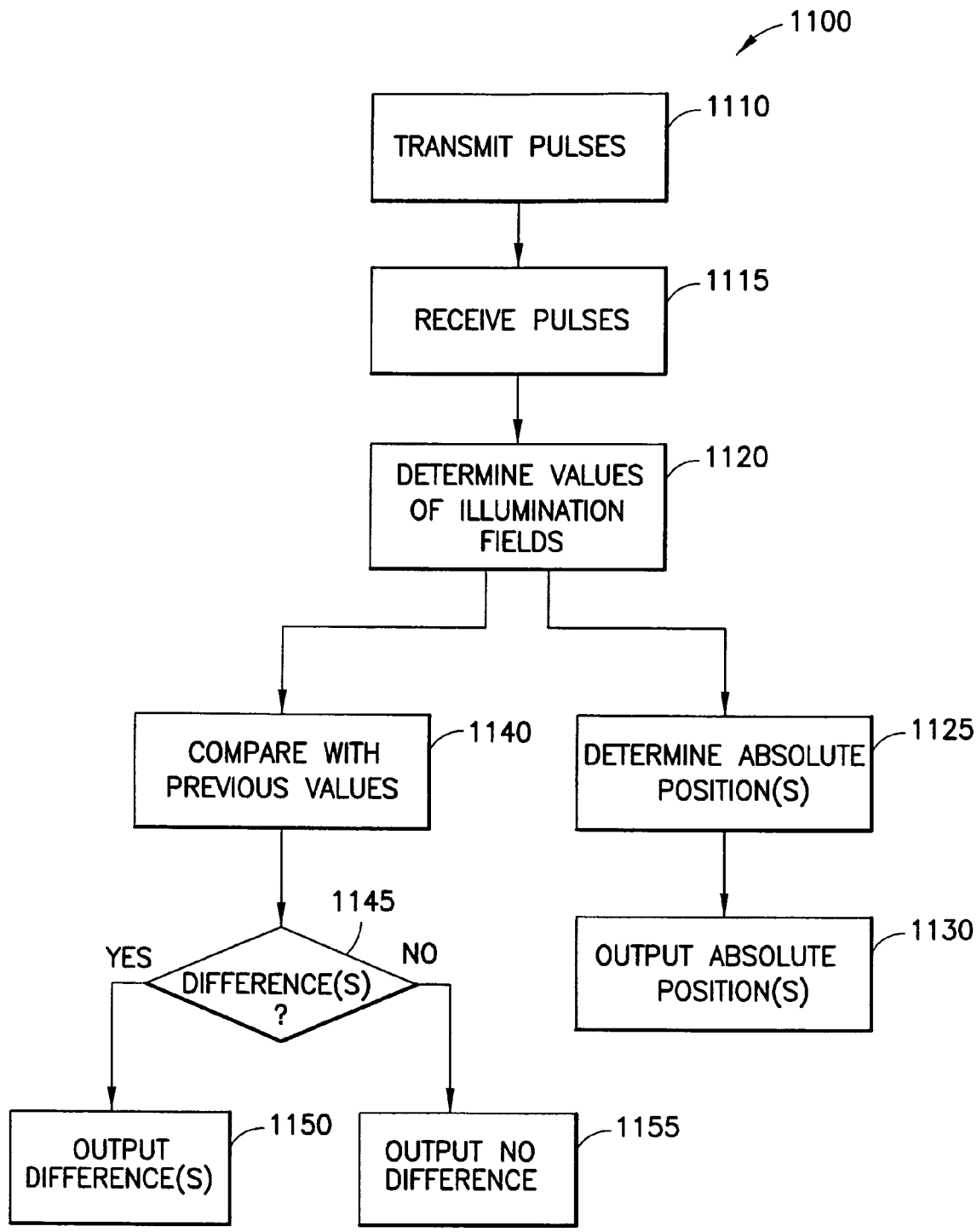
FIG. 11 is a flowchart of a method for determining position of a transmitter relative to a detector and/or movement of the transmitter relative to the detector.

Turning now to FIG. 11, a flowchart is shown of a method 1100 for determining position of a transmitter relative to a detector and/or movement of the transmitter relative to the detector. The method 1100 is performed by a transmitter and a receiver (see FIG. 12). In step 1110, one or more emitters of a transmitter transmit pulses of energy beams. As shown above, the each beam creates an illumination field with an intensity gradient substantially transverse to a direction of propagation of the beam. The directions of the intensity gradients change between certain pulses of the energy beams.

In step 1115, the receiver receives the pulses. In step 1120, the receiver determines values of portions of the illumination fields that impinge on one or more detectors. Steps 1125 and 1130 provide an absolute position control mode, which attempts to determine the x,y values at which the transmitter is relative to the detector on the receiver. Note that "absolute" in this case means that particular x,y values are determined for position vectors, but that the values are still relative to a detector on the receiver. In other words, if there are two detectors spaced a large distance apart on a large receiver, each detector would determine a different x,y value for an emitter. Steps 1140-1155 provide a relative position control mode, which attempts to determine translational movement or rotational movement of the transmitter relative to a detector on the receiver. Note that step 1125 can use inputs from multiple detectors (see FIGS. 17A and 17B).

In step 1125, the absolute position(s) is (are) determined. The absolute position will typically be given a (x,y), but could be simply x or y. This "absolute" position is based on the relative position of the transmitter relative to the detector. The absolute position, as shown in the equation above, is typically given in percent. In step 1130, the absolute position would be output. Typically, the output would be to a certain function, which would then use the position.

In step 1140, currently determined values for x,y are compared with previous values. If there are any differences (step 1145=YES), the differences are output in step 1150. Typically, this output would be "the transmitter moved in the +y direction" or "the transmitter moved 5% in the +y direction". Any suitable technique for indicating movement in one or more directions may be used. Note that step 1140 can use inputs from multiple detectors (see FIGS. 17A and 17B) in order to produce outputs for each of the detectors. If there are no differences (step 1145=NO), then typically some type of indication would be output, such as "no difference between the last sample". Note that these outputs could be hardware signals (e.g., carried over traces) or software signals (e.g., messages between software modules).

Figure 12:
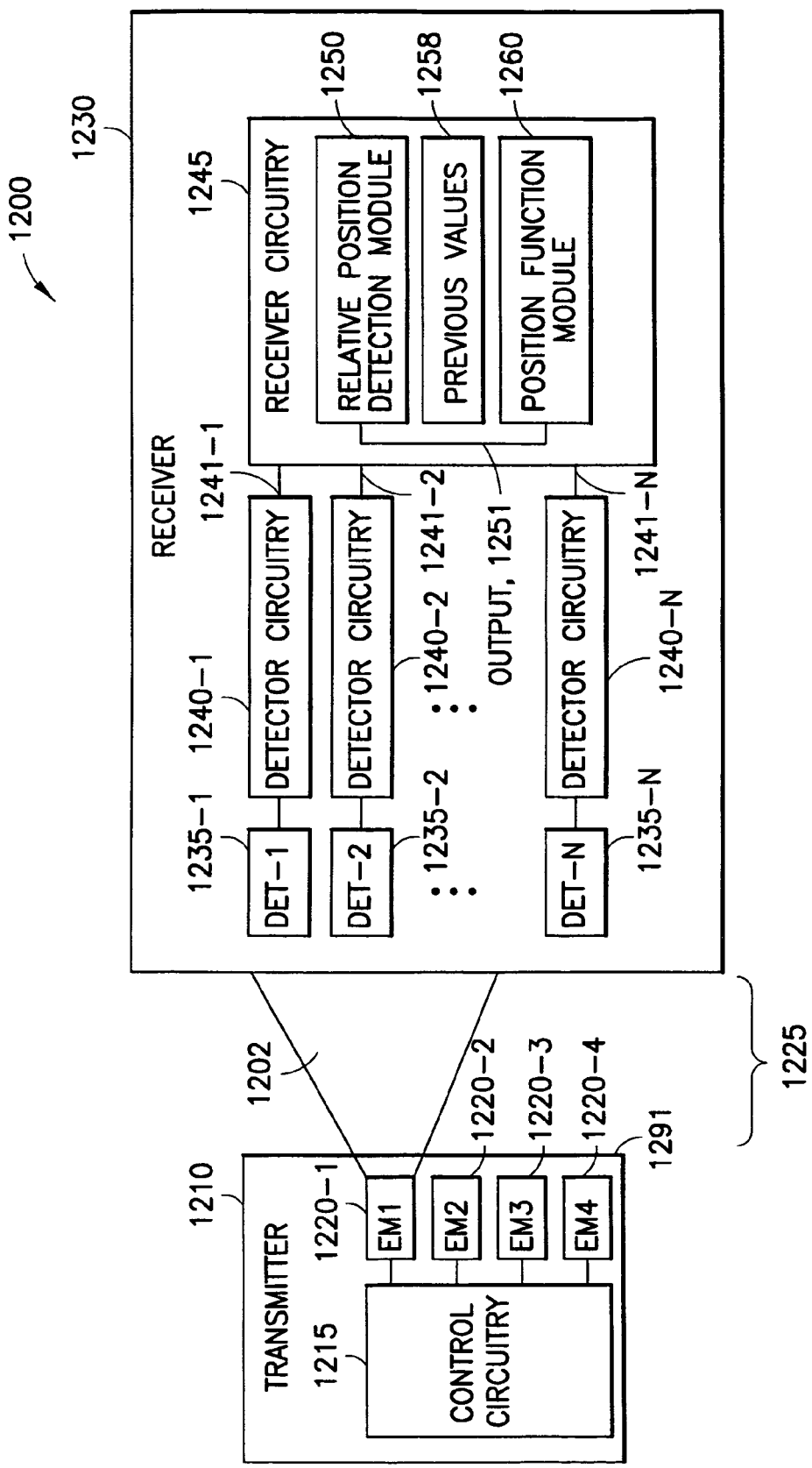
FIG. 12 is a block diagram of a system that provides relative position detecting functionality.

Referring now to FIG. 12 with appropriate reference to preceding figures, a block diagram is shown of a system 1200 that provides relative position detecting functionality. System 1200 comprises a transmitter 1210 that transmits energy beams 1202 (of which one is shown in FIG. 12) over a channel 1225 to a receiver 1230. It should be noted that the transmitter 1210 could be a pointing device 1, as shown in FIGS. 1-4 and 6-10. In an exemplary embodiment, the transmitter 1210 is moveable and the receiver 1230 is fixed. In other embodiments, the transmitter 1210 can be fixed and the receiver 1230 is movable. Both the transmitter 1210 and receiver 1230 can be movable.

In the example of FIG. 12, the transmitter 1210 comprises control circuitry and four emitters 1220-1 through 1220-4. In one exemplary embodiment, each emitter 1220 produces one of the illumination fields 6-9. The control circuitry is adapted to create the sequence 500 of pulses in order to create the illumination fields 6-9. The control circuitry is also adapted to create the pauses 550, if used. An example of an emitter 1220 used to produce a linear intensity gradient for IR illumination fields is shown in FIG. 13. The transmitter 1210 would perform step 1210 of method 1100 of FIG. 11.

Figure 20:
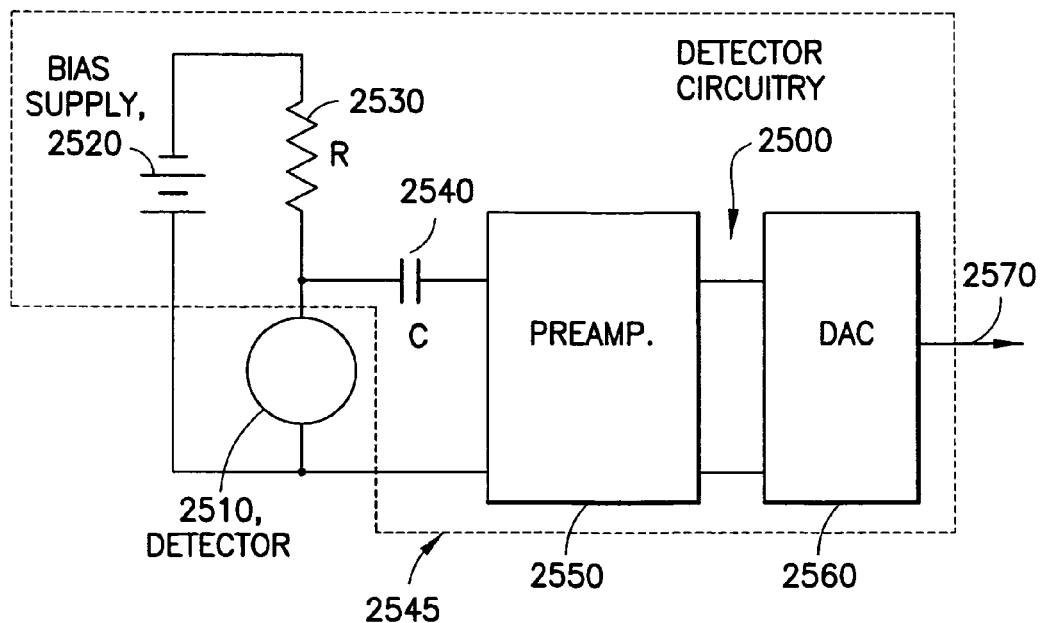
FIG. 20 is a block diagram of an exemplary detector coupled to exemplary detector circuitry.

The receiver 1230 comprises N detectors 1235-1 through 1235-N, which in combination with a corresponding detector circuitry 1240-1 through 1240-N, produces values 1241-1 to 1241-N of the illumination field seen by individual detectors 1235. The detectors 1235 would typically be photodiodes and corresponding detector circuitries 1240 are known to those skilled in the art. An exemplary detector circuitry is shown in FIG. 20. The values 1241 could be voltages, digital numbers converted from voltages, or any other indication of the illumination field seen by a detector 1235. It should be noted that some or all of the detector circuitry 1240 could be shared amongst the detectors 1235. For instance, the detector circuitry 1240 could be multiplexed to the detectors 1235. In other words, one detector circuitry 1240 would be multiplexed with all (or a portion) of the N detectors 1235. Additionally, each detector 1235 could comprise the detector circuitry 1240.

The receiver circuitry 1245 comprises a relative position detection module 1250, previous values 1255 (if used), and a position function module 1260. Relative position detection module 1250 would perform, using values 1241, steps 1120-1155 of method 1100 of FIG. 11. The previous values 1255 are values 1241 stored from other sequences 500 from the detectors 1235.

The position function module 1260 is a module that accepts output 1251 (e.g., from steps 1130, 1150, and 1155 of FIG. 11) from the relative position detection module 1250 and performs some function using the output 1251. For instance, a TV 5 could have a cursor on the screen and the cursor would be moved in accordance with the output 1251. As another example, the receiver 1230 could be a game controller and a character on the screen of the TV 1251 could be moved based on the output 1251.

Referring now to FIG. 20, FIG. 20 is a block diagram of an exemplary IR detector 2150 coupled to exemplary detector circuitry 2500. The detector circuitry 2500 comprises a bias supply 2520, a resistor 2530, a capacitor 2540, a preamplifier (preamp) 2550 and a Digital to Analog Converter (DAC) 2560. The bias supply 2520, resistor 2530, capacitor 2540, and detector 2510 operate to produce a voltage at node 2545, and this voltage is proportional to the illumination level hitting the detector 2510. The preamp 2550 increases this voltage to a higher voltage at node 2550 and perhaps increases the drive capability. The DAC 2560 produces digital output 2570 that is a representation of the voltage at node 2550. In this example, the DAC 2560 could be multiplexed to multiple preamps 2550, or the preamp 2550 could be multiplexed to multiple nodes 2545. In the example of FIG. 20, the detector 2510 is a photodiode. Nonetheless, a "detector" can incorporate elements other than a sensor such as a photodiode. For instance, depending on implementation, a "detector" could incorporate the bias supply 2510, the resistor 2530, the photodiode 2510, and the capacitor 2540.

Figure 13A:
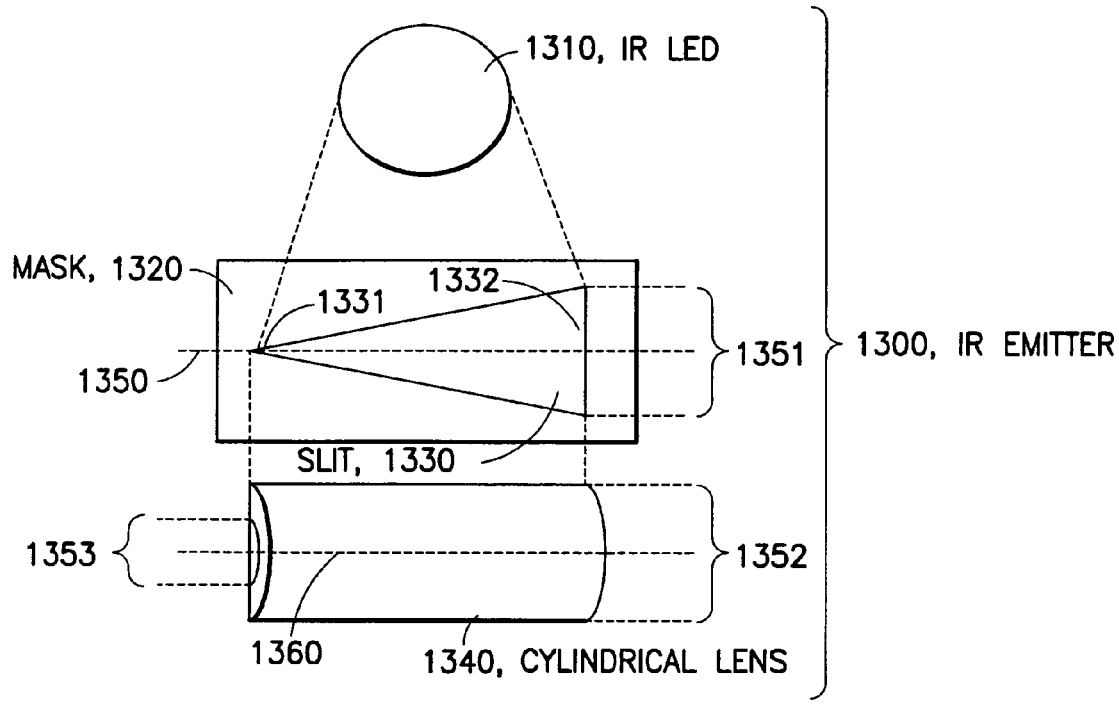
FIG. 13A shows a disassembled view of an exemplary IR emitter used in a transmitter to produce a pulse of an energy beam having an illumination field with a linear intensity gradient.

Creating intensity gradients can be implemented using separate IR LEDs and optics for each of the four illumination fields. Turning to FIG. 13A in addition to FIG. 12, an exemplary IR emitter 1300 is shown in FIG. 13A. IR emitter 1300 is one of the emitters 1220 of the transmitter 1210. For each IR LED 1310, the emitted energy beam (i.e., IR light) passes first through a mask 1320 having a slit 1330 that is narrower at one end 1331 and wider at the other end 1332. The narrow field is then spread by a cylindrical lens 1340. Slit 1330 is triangular in this example. The slit 1330 and mask 1320 have a longitudinal axis 1350 that is substantially aligned with the longitudinal axis 1360 of the cylindrical lens 1340. It is recommended that the outer diameter 1352 of the cylindrical lens 1340 be at least as large as the width 1351 of the larger end 1332 of the slit 1330. Typically, the inner diameter 1353 of the cylindrical lens would be at least as large as the width 1351 of the larger end 1332 of the slit 1330. It should be noted that the slit 1330 would be oriented four different ways relative to the front 1291 of the transmitter 1210 to provide all four emitters 1220 emitting the four different illumination fields 6-9 shown in FIGS. 1-4. It is also possible to have one LED 1310 that communicates with four masks 1320 and cylindrical lenses 1340 (or one large mask 1320 with four slits 1330, where each slit 1330 is covered with a cylindrical lens 1340).

The LEDs 1310 can also double as transmitters of digital data to the screen, which would facilitate key presses and the like. By using LEDs 1310 and photodiodes as detectors 1235 working at different wavelengths, the illumination fields (e.g., and digital data) can be emitted simultaneously, making the system faster. In any case, it is beneficial to have the LEDs 1310 and photodiodes as detectors 1235 operate at a narrow bandwidth in order decrease the effect of ambient IR radiation.

Figure 13B:
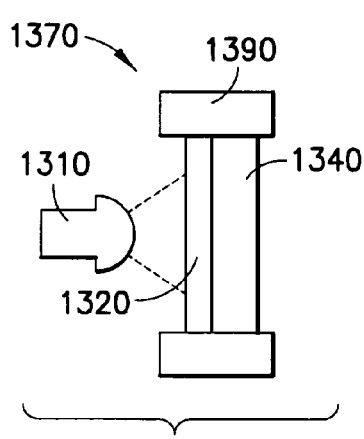
FIG. 13B shows another view of another IR emitter similar to that in FIG. 13A.

It is noted that another, more complex option, is to have the mask 1320 and the cylindrical lens 1340 move into four different locations spaced 90 degrees apart (e.g., 0, 90, 180, and 270 degrees). This is shown in FIG. 13B, where an IR emitter 1350 comprises the IR LED 130, the mask 1320, and the cylindrical lens 1340, but with a rotation device 1390 adapted to rotate the mask 1320 and cylindrical lens 1340 into the four different locations (e.g., or into fewer or more locations). These four different locations would create the four illumination fields shown in FIGS. 1-4, although in the order of (for instance) FIG. 1, FIG. 3, FIG. 2, and FIG. 4. This embodiment would use only one LED 1310 but a movement mechanism would add to complexity.

The detector 1235 can be mounted anywhere on the device to be controlled as long as the detector 1235 is toward the user when the user wishes to interact with the detector by using the transmitter 1210. The detector 1235 does not have to be built-in. Instead, for instance, the detector can also be an enhancement plugged to a port on the receiver 1230 to be controlled. By placing several detectors 1235 (e.g., and associated detector circuitry 1240) around the room, even 360 degree (e.g., spherical) control can be achieved.

The roles of the transmitter 1210 and receiver 1250 can be reversed: the emitter 1300 could be stationary in the room and the detector 1235 could be held by the user. In this case the lateral movement, instead of rotation, of the handheld device could be detected. By having an emitter 1300 and a detector 1235 on both the stationary device and a handheld device, both lateral movement and rotation could be detected.

Figure 14:
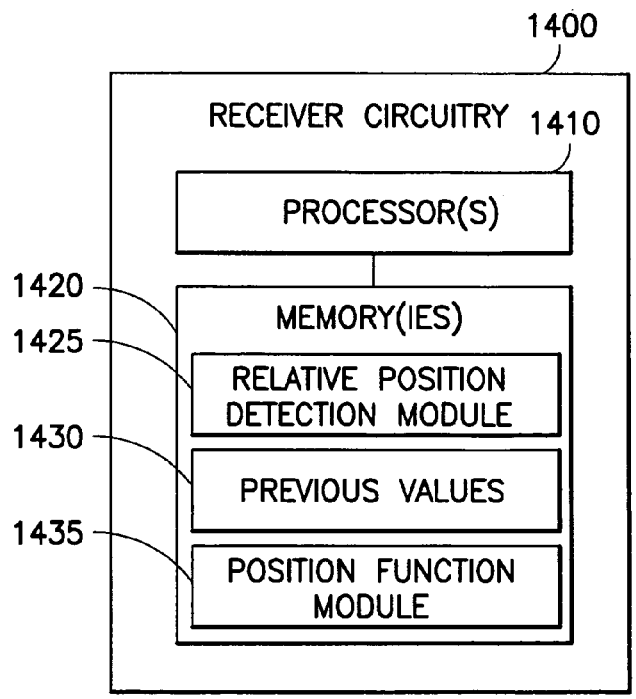
FIG. 14 is a block diagram of exemplary receiver circuitry.

Turning now to FIG. 14, a block diagram of exemplary receiver circuitry 1400 is shown. Receiver circuitry 1400 is one example of an implementation of receiver circuitry 1245 of the receiver 1230 of FIG. 12. In this example, receiver circuitry 1400 comprises one or more processors 1410 coupled to one or more memories 1420. The one or more memories 1420 comprise a relative position detection module 1425, previous values 1430, and a position function module 1435, as described above with reference to FIG. 12 (see relative position detection module 1250, previous values 1255, and position function module 1260, respectively). In FIG. 14, the modules 1425 and 1435 are software modules suitable to configure the processor(s) 1410 to perform one or more operations described herein. It should also be noted that the modules 1425, 1435 could be implemented as signal bearing medium (e.g., in memories 1420 such as a hard drive, compact disk, digital versatile disk, and memory stick) tangibly embodying a program of machine-readable instructions executable by a digital processing apparatus to perform operations described herein.

Figure 15:
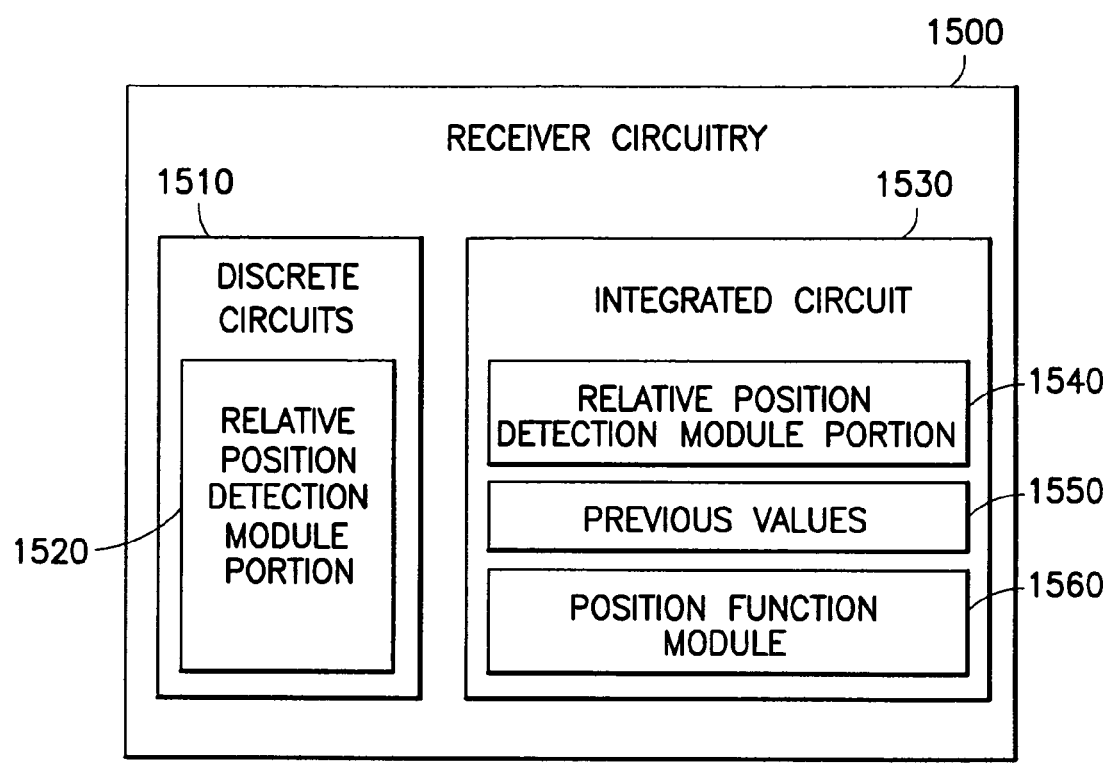
FIG. 15 is a block diagram of another exemplary receiver circuitry.

Referring now to FIG. 15, a block diagram of exemplary receiver circuitry 1500 is shown. Receiver circuitry 1500 is another example of an implementation of receiver circuitry 1245 of the receiver 1230 of FIG. 12. Receiver circuitry 1500 comprises discrete circuits 1510 comprising a relative position detection module portion 1520. Receiver circuitry 1530 also comprises an integrated circuit 1530 comprising a relative position detection module 1540, previous values 1550, and a position function module portion 1560, as described above with reference to FIG. 12 (see relative position detection module 1250, previous values 1255, and position function module 1260, respectively). Discrete circuits 1510 comprise individual transistors, capacitors, and other elements including possibly programmable logic devices.

In this example, the relative position detection module portions 1520 and 1540 implement a single relative position detection module 1250. In other embodiments, the integrated circuit 1530 contains both the relative position detection module portions 1520 and 1540 as a single module. As another example, there could be no discrete circuits as part of receiver circuitry 1500. In still other embodiments, the receiver circuitry can comprise one or more processors, one or more memories, one or more integrated circuits (e.g., containing a processor), and one or more discrete circuits. It should be noted that the control circuitry 1215 can also comprise one or more processors, one or more memories, one or more integrated circuits (e.g., containing a processor), and one or more discrete circuits.

In other exemplary implementations, different types of emitted energy can be used. In principle, the invention can be implemented with any kind of emitted energy beams which can be given an intensity gradient transverse to the direction of propagation, such as: (1) electromagnetic radiation of different wavelengths, such as IR light, visible light, ultraviolet (UV) light (e.g., with visible light you could select the device to be controlled by illuminating the device as if using a torch); and (2) sound (e.g., ultrasound).

As another example, the intensity gradient shown in FIGS. 1-4 may also have some amount of nonlinearity, particularly for the relative position control mode. For instance, the intensity gradient might be nonlinear at the edges of the illumination field. As long as a portion of the illumination field is linear, the system 1200 should still operate in both the absolute and relative position control modes when the detector is within the linear portion of the illumination field. Furthermore, the entire illumination field could be designed with a nonlinear intensity gradient. While a nonlinear intensity gradient would make an absolute position control mode harder, the relative position control mode could still be performed with relative ease.

Different projected images, other than simple gradients, can also be used. For example, the illumination field projected by the transmitter may be more complicated than mere intensity gradients. Generally speaking, the transmitter projects an image or sets of images on a more or less point-like detector residing in the device being controlled (e.g., the receiver). The device being controlled (e.g., receiver 1230) recognizes position of the detector in the image being projected on the receiver. Or, preferably, the device being controlled detects the direction and velocity of the movement of the image over the detector.

Figure 19:
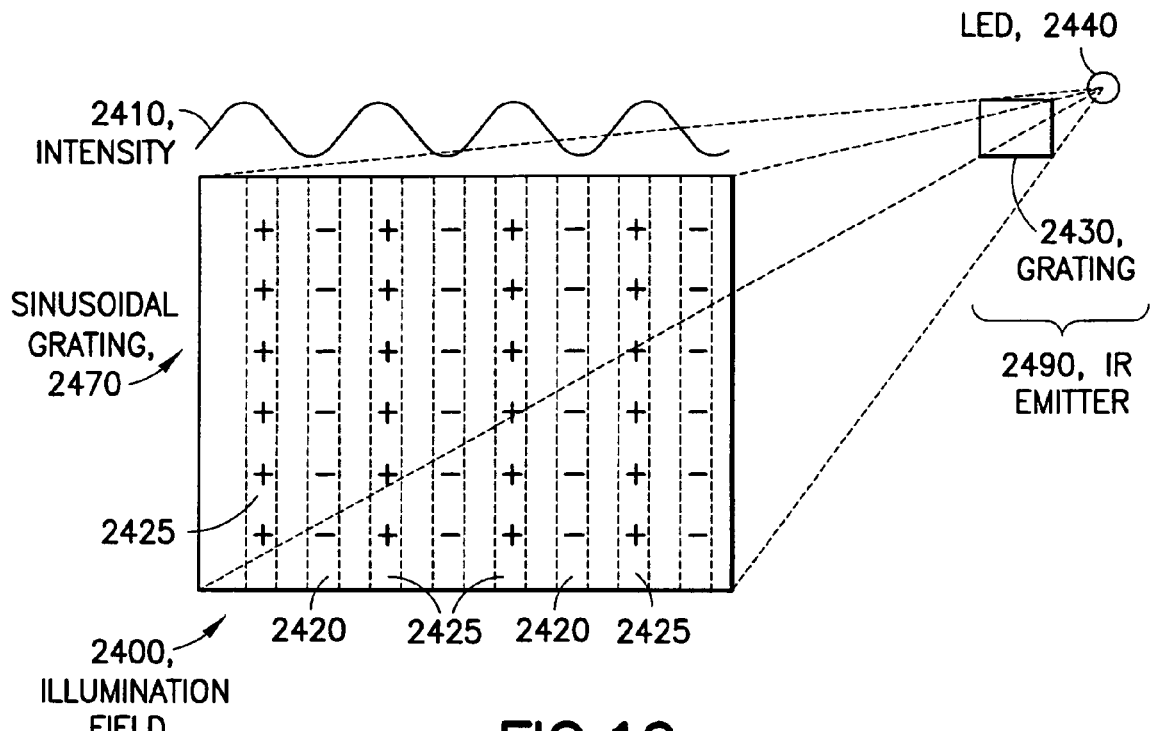
FIG. 19 is a diagram of an emitter that causes an illumination field having a sinusoidal grating so that a receiver can determine fine position.

As a first example, consider a system that uses vertical and horizontal gradients (see, e.g., FIGS. 7 and 8, respectively) for gross position detecting and then uses a sinusoidal grating to establish fine position. FIG. 19 shows an emitter 2490, comprising an IR LED 2440 and a grating 2430, that produces a sinusoidal grating 2470 for an illumination field 2400. The grating 2430 produces an intensity 2410 that is sinusoidal and causes high intensity areas 2425 and low intensity areas 2420 in the sinusoidal grating 2470. These high and low intensities can be used for fine position detecting. Typically, a vertical (as shown in FIG. 19) sinusoidal grating 2470 would be transmitted to allow x-value determination, followed by a horizontal sinusoidal grating 2470 to allow y-value determination. Note that both vertical and horizontal sinusoidal grating could be transmitted at the same time if transmitted using different frequencies. FIG. 19 illustrates that intensity gradients can vary in pattern and need not be simple linear gradients.

Consider, as another example, commercially available digital pens. One such digital pen detects the position of its tip on a special pattern printed on paper. The pattern used on the paper could be projected (e.g., by an IR emitter) as an image with the remote pointing device on a detector resembling that on the Digital Pen. The image would be caused by an intensity gradient that varies, e.g., as a pattern. The image could be a pattern such as a grid, square wave, and logarithmic grids. There are problems with this approach, however. The pointing device would have to project an image of quite a high resolution. In addition, the pattern would have to be in focus at the distance of the detector. The benefit of using a simple, linear gradient as an intensity gradient for an illumination field is that the illumination field (and its corresponding intensity gradient) does not have to be in focus.

Figure 16:
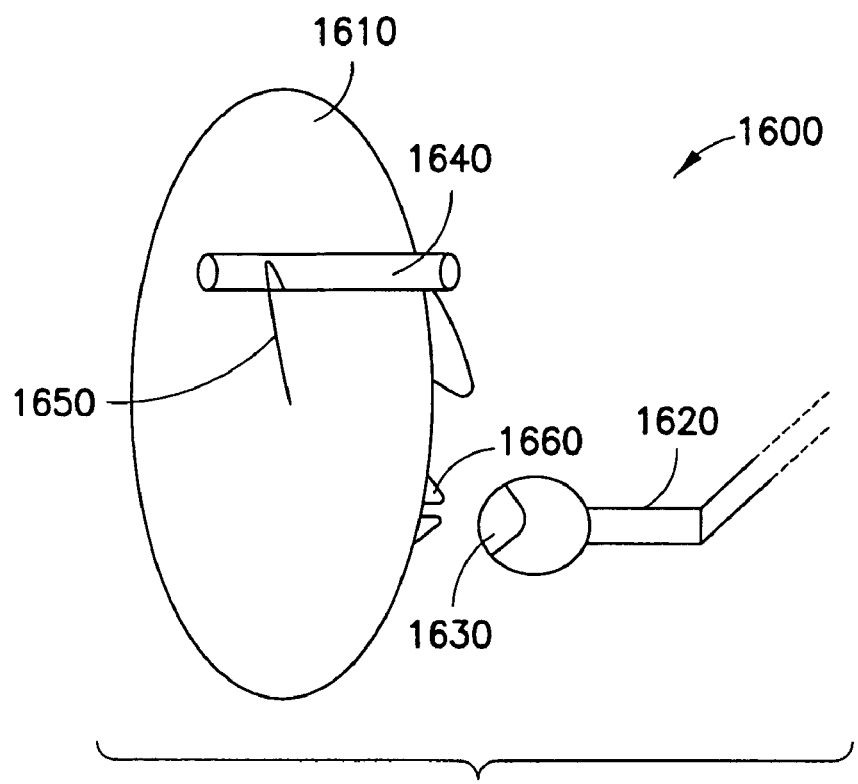
FIG. 16 is a diagram of an example of human interaction with an input system allowing hands free operation.

Turning now to FIG. 16, another exemplary embodiment is shown that is a head mounted pointing device 1610 (e.g., pointing device 1 of FIGS. 1-4). An input system 1600 comprises the head mounted pointing device 1610 and boom 1620. The pointing device 1610, provided that the optics can be made small enough, could be used as head mounted pointing device. At its simplest, a pen-like pointing device 1610 could be worn on the ear (as shown in FIG. 16, where the pointing device is shown on the ear 1650 of human head 1610), the same way people sometimes do with a normal pen. The pointing device could be incorporated into a headset (not shown), glasses, helmet, hat, or though any other technique. A head-mounted pointing device 1640 frees the hands for using a keyboard or game controls. Especially, it could be an intuitive way of scrolling a two dimensional page or changing the direction of view in three dimensional games, while pointing simultaneously with a hand-operated input device.

An interesting possibility for total hands-free use is to bring an adjustable boom 1620 (e.g., a microphone boom) very close to the lips and provide the boom 1620 with a capacitive touch-key 1630. By pushing the lower lip 1660 outwards a contact is made and a cursor is activated. The method may sound awkward, but the sensitivity of the lips makes it easy for the user to sense if the lip is in contact with the boom or not. Consequently, only very subtle movements, requiring negligible force, are needed for operating the touch-key.

A drawback is that the distance of the boom 1620 from the lips may be difficult to adjust and maintain. There is an alternative solution using a touch key (e.g., capacitive key 1630), which may be awkward but very robust: The user can touch the touch key with his tongue. This system will not look nice, but the system will work and could be useful in some demanding usage contexts. The touch key can be placed in a slight recess to avoid accidental activation.

A benefit from using the disclosed embodiments, instead of an accelerometer in the controlled device, is that the movement is detected relative to the user. This way, the control is less susceptible to interference caused by the user moving about or riding in a vehicle. The control is also versatile because the same effect can be achieved by moving different body parts, e.g., the head or the hands.

It should be noted that the intensity gradients shown in FIGS. 1-4, 7, 8, and 19 concern an intensity gradient having a varying amplitude. FIGS. 1-4, 7, and 8 show a linear varying intensity gradient, while FIG. 19 shows an intensity gradient that is varied sinusoidally. Discussed above was also the technique of having an intensity gradient vary in shape. It is noted that these previous discussions limit the variance in intensity gradient to amplitude variations. However, the intensity gradient can also be varied in other manners, such as through frequency variation or polarization variation. The techniques described above can be modified accordingly. For frequency variation, as an example, in FIG. 19, the grating 2430 could be replaced by a prism or similar frequency separation device to create an intensity gradient that varies in frequency. As another illustration for frequency variation, for the illumination field 30 (see FIG. 7), the frequency of the detector's peak sensitivity could be used for the calibration field shown in FIG. 6. The same would be true for a polarization gradient. Detectors would be sensitive to the variable, such as amplitude, frequency, or polarization, being varied in the intensity gradient. Additionally, an illumination field can use gradients other than a linear gradient. For instance, each illumination field limits the possible positions of detector to points in the field having the detected magnitude of the variable. These points would lie along a line. For example, a horizontal intensity gradient (see FIG. 1) limits the possible positions to a vertical line. A radial gradient would have possible positions that yield a circle. Further, the sequences of illumination fields shown in FIGS. 1-4 and 6-8 are merely exemplary. For instance, the illumination field 30 in FIG. 6 could be transmitted after the illumination field 31 in FIG. 7.

It should be noted that the various blocks of the logic flow diagram of FIG. 11 may represent program steps, or interconnected circuitry, or a combination of program steps and interconnected circuitry for performing the specified tasks.

In general, the various embodiments of one or both of the transmitter and receiver can include, but are not limited to, cellular telephones, remote controls, pen pointers, personal digital assistants (PDAs), televisions, portable or non-portable computers, image capture devices such as digital cameras, gaming devices, televisions, music storage and playback appliances, Internet appliances, as well as portable or non-portable units or terminals that incorporate combinations of such functions.

The memory(ies) 1420 or other memories may be of any type suitable to the local technical environment and may be implemented using any suitable data storage technology, such as semiconductor-based memory devices, magnetic memory devices and systems, optical memory devices and systems, fixed memory and removable memory. The processor(s) 1410 may be of any type suitable to the local technical environment, and may include one or more of general purpose computers, special purpose computers, microprocessors, digital signal processors (DSPs) and processors based on a multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate. Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with accompanying drawings and the appended claims. Nonetheless, all such and similar modifications of the teachings of this invention will still fall within the scope of this invention. Furthermore, some of the features of the embodiments of this invention could be used to advantage without the corresponding use of other features. As such, the foregoing description should be considered as merely illustrative of the principles of the present invention, and not in limitation thereof.

What is claimed is:

1. A method comprising:

transmitting from at least one emitter a first pulse of a first energy beam, the first beam creating a first field with a first varying intensity gradient having a first direction substantially transverse to a propagation direction of the first beam;

transmitting from the at least one emitter a second pulse of a second energy beam, the second beam creating a second field having a uniform intensity in a second direction substantially transverse to a propagation direction of the second beam;

transmitting from the at least one emitter a third pulse of a third energy beam, the third beam creating a third field with a second varying intensity gradient having a third direction substantially transverse to a propagation direction of the third beam, wherein the third direction is substantially perpendicular to the first direction, wherein there is a time period wherein the at least one emitter does not transmit any of the first, second, and third beams;

receiving at a plurality of detectors a portion of each of the first, second, and third fields;

for a respective one of the plurality of detectors and for each of the first, second, and third fields, determining a value corresponding to an illumination level of the portion of the respective field received by the respective detector, wherein the values corresponding to the first and third fields are indicative of relative position between the respective detector and the at least one emitter;

for the respective detector, determining a value during at least a portion of the time period;

for the respective detector, determining two first component values indicative of relative position between the respective detector and the at least one emitter based upon the values for the first, second, and third fields and the value determined during the time period, wherein one of the first component values is indicative of relative position corresponding to an axis parallel to the first direction, and wherein the other of the first component values is indicative of relative position corresponding to an axis parallel to the third direction;

determining two second component values for another of the plurality of detectors, wherein the two second component values are indicative of relative position between the respective detector and the at least one emitter based upon the values for the first, second, and third fields and the value determined during the time period;

forming a first vector using the first component values;

forming a second vector using the second component values; and determining, using the first and second vectors, relative rotation between the at least one emitter and a receiver comprising the plurality of detectors.

2. The method of claim 1, further comprising:

comparing the value for the respective detector with a previously determined value from the respective detector; and using the comparison, determining whether there has been movement between the emitter and the respective detector.

3. The method of claim 1, further comprising:

based on the values of the first and second fields for the respective detector, determining a value for an absolute position of the at least one emitter relative to the respective detector.

4. The method of claim 1, wherein the first and second energy beams are infrared beams.

5. The method of claim 1, wherein the at least one emitter comprises first and second emitters, the first emitter transmitting the first energy beam and the second emitter transmitting the second energy beam.

6. The method of claim 5, wherein the first and second emitters transmit using the same wavelength.

7. The method of claim 5, wherein the first and second emitters transmit using different wavelengths.

8. The method of claim 5, further comprising:
transmitting a calibration field by transmitting at the same time both the first and second energy beams using the first and second emitters.

9. The method of claim 5, further comprising determining a maximum illumination level by adding the values for the respective detector and for each of the first and second fields.

10. The method of claim 1, wherein the at least one emitter comprises a single emitter.

11. The method of claim 1, further comprising:
transmitting from the at least one emitter a third pulse of a third energy beam, the third beam creating a third field with a third varying intensity gradient having a third direction substantially transverse to a propagation direction of the third beam, the third direction approximately 90 degrees relative to one of the first direction and second direction;
transmitting from the at least one emitter a fourth pulse of a fourth energy beam, the fourth beam creating a fourth field with a fourth varying intensity gradient having a fourth direction substantially transverse to a propagation direction of the fourth beam, wherein the fourth direction is substantially opposite the third direction;
receiving at the at least one detector a portion of each of the third and fourth fields; and
for the respective detector and each of the third and fourth fields, determining a value corresponding to an illumination level of the portion of the respective field received by the respective detector.

12. The method of claim 1, wherein at least one of the first, second and third fields comprises one of infrared, visible light, ultraviolet light, and sound.

13. The method of claim 1, wherein at least one of the first and second varying intensity gradients varies in one of amplitude, frequency, and polarization.

14. The method of claim 1, wherein at least one of the first and second varying intensity gradients varies linearly along an axis within an area of the respective field.

15. The method of claim 14, wherein at least one of the first and second varying intensity gradients varies linearly along the axis for one of a flat projection surface and a hemispheric projection surface.

16. The method of claim 1, wherein at least one of the first and second varying intensity gradients varies according to a pattern.

17. The method of claim 16, wherein the pattern comprises a sinusoidal grating.

18. The method of claim 1, wherein at least one of the first and second varying intensity gradients varies radially within an area of the respective field.

19. The method of claim 1, wherein the at least one emitter is capable of moving.

20. The method of claim 19, wherein a rotational movement of the at least one emitter performs coarse pointing and a translational movement of the emitter performs fine pointing.

21. A receiver comprising:
a plurality of detectors adapted to receive a portion of a first field of a first energy beam, the first field having a first varying intensity gradient having a first direction substantially transverse to a propagation direction of the first beam, the plurality of detectors further adapted to receive a portion of a second field of a second energy beam, the second field having a second varying intensity gradient having a second direction substantially transverse to a propagation direction of the second beam, the plurality of detectors further adapted to receive a portion of a third field of a third energy beam, the third field having a uniform intensity in a third direction substantially transverse to a propagation direction of the third beam; and
detector circuitry coupled to the plurality of detectors and adapted to determine values for a respective one of the plurality of detectors and for each of the first, second, and third fields, each value corresponding to an illumination level of a portion of the respective field received by the respective detector, the detector circuitry further adapted to use the values to determine relative position between the respective detector and at least one emitter that emitted the first, second and third energy beams, wherein the detector circuitry is further adapted to determine a value during at least a portion of a time period when the at least one emitter does not transmit any of the first, second, and third beams, wherein the detector circuitry is further adapted to determine two first component values indicative of relative position between the respective detector and the at least one emitter based upon the values for the first, second, and third fields and the value determined during the time period, wherein one of the first component values is indicative of relative position corresponding to an axis parallel to the first direction, and wherein the other of the first component values indicative is of relative position corresponding to an axis parallel to the second direction, wherein the detector circuitry is further adapted to determine two second component values for another of the plurality of detectors, wherein the two second component values are indicative of relative position between the respective detector and the at least one emitter based upon the values for the first, second, and third fields and the value determined during the time period, wherein the detector circuitry is further adapted to form a first vector using the first component values and to form a second vector using the second component values, wherein the first and second vectors are used to determine relative rotation between the at least one emitter and the receiver.

22. The receiver of claim 21, wherein the second direction is substantially opposite the first direction.

23. The receiver of claim 22, wherein the receiver circuitry is further adapted to compare the values with previously determined values, and using the comparison to determine whether there has been movement between the at least one emitter and the plurality of detectors, the relative position comprising the movement.

24. The receiver of claim 22, further comprising:
receiver circuitry coupled to the detector circuitry and adapted to compare the values of the first and second fields.

25. The receiver of claim 24, further comprising receiver circuitry coupled to the detector circuitry and adapted to compare the values of the first and second fields, and wherein the receiver circuitry is further adapted, based on the comparison of the first and second fields, to determine a value for an absolute position with respect to the plurality of detectors of the at least one emitter, wherein the relative position comprises the absolute position.

26. The receiver of claim 22,
wherein the third direction is approximately 90 degrees relative to one of the first direction and the second direction;
wherein the plurality of detectors is further adapted to receive a portion of a fourth field of a fourth energy beam, the fourth field with a fourth varying intensity gradient having a fourth direction substantially transverse to a propagation direction of the fourth beam, wherein the fourth direction is substantially opposite the third direction;
wherein the detector circuitry is further adapted to determine a values corresponding to an illumination levels of a portions of the fourth fields received by the plurality of detectors.

27. The receiver of claim 21, wherein each of the plurality of detectors comprises one of an infrared detector, a visible light detector, an ultraviolet light detector, and a sound detector.

28. The receiver of claim 21, wherein each of the first and second varying intensity gradients varies in one of amplitude, frequency, and polarization.

29. The receiver of claim 21, wherein each of the plurality of detectors comprises a photodiode.

30. The receiver of claim 21, wherein each of the plurality of detectors is adapted to detect a predetermined range of frequencies, and wherein at least one of the predetermined ranges is different from others of the predetermined ranges.

31. The receiver of claim 21, wherein each of the plurality of detectors is adapted to detect a single range of frequencies.

* * * * *